(12) United States Patent
Swanson et al.

(10) Patent No.: US 9,798,641 B2
(45) Date of Patent: Oct. 24, 2017

(54) METHOD TO INCREASE CLOUD AVAILABILITY AND SILICON ISOLATION USING SECURE ENCLAVES

(71) Applicant: Intel Corporation, Santa Clara, CA (US)

(72) Inventors: Robert C. Swanson, Olympia, WA (US); Theodros Yigzaw, Sherwood, OR (US); Eswaramoorthi Nallusamy, Puyallup, WA (US); Raghunandan Makaram, Northborough, MA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 14/978,597

(22) Filed: Dec. 22, 2015

(65) Prior Publication Data

US 2017/0177457 A1 Jun. 22, 2017

(51) Int. Cl.
*G06F 11/00* (2006.01)
*G06F 11/263* (2006.01)
(Continued)

(52) U.S. Cl.
CPC .............. *G06F 11/263* (2013.01); *G06F 1/24* (2013.01); *G06F 11/073* (2013.01);
(Continued)

(58) Field of Classification Search
CPC ........ G06F 1/24; G06F 11/073; G06F 11/263; G06F 11/1016; G06F 21/53; G06F 2221/034
See application file for complete search history.

(56) References Cited

U.S. PATENT DOCUMENTS

2006/0075312 A1 4/2006 Fischer et al.
2012/0159184 A1* 6/2012 Johnson .............. G06F 12/1466
713/189
(Continued)

OTHER PUBLICATIONS

International Search Report and Written Opinion received for PCT Patent Application No. PCT/US2016/062188, mailed on Feb. 14, 2017, 11 pages.

(Continued)

Primary Examiner — Joshua P Lottich
(74) Attorney, Agent, or Firm — Law Offices of R. Alan Purnett, P.S (57) ABSTRACT

Methods and apparatus to increase cloud availability and silicon isolation using secure enclaves. A compute platform is configured to host a compute domain in which a plurality of secure enclaves are implemented. In conjunction with creating and deploying secure enclaves, mapping information is generated that maps the secure enclaves to platform/CPU resources, such as Intellectual Property blocks (IP) belong to the secure enclaves. In response to platform error events caused by errant platform/CPU resources, the secure enclave(s) belonging to the errant platform/CPU are identified via the mapping information, and an interrupt is directed to that/those secure enclave(s). In response to the interrupt, a secure enclave may be configured to one or more of handle the error, pass information to another secure enclave, and teardown the enclave. The secure enclave may execute an interrupt service routine that causes the errant platform/CPU resource to reset without resetting the entire platform or CPU, as applicable.

25 Claims, 7 Drawing Sheets

(51) Int. Cl.
*G06F 1/24* (2006.01)
*G06F 21/53* (2013.01)
*G06F 11/10* (2006.01)
*G06F 11/07* (2006.01)

(52) U.S. Cl.
CPC .......... *G06F 11/1016* (2013.01); *G06F 21/53* (2013.01); *G06F 2221/034* (2013.01)

(56) References Cited

U.S. PATENT DOCUMENTS

| | | | |
|---|---|---|---|
| 2013/0152209 A1 | 6/2013 | Baumann et al. | |
| 2013/0159726 A1* | 6/2013 | McKeen | G06F 21/72 713/189 |
| 2013/0232344 A1 | 9/2013 | Johnson et al. | |
| 2014/0089682 A1 | 3/2014 | Gulati et al. | |
| 2014/0237299 A1 | 8/2014 | Nachimuthu et al. | |
| 2014/0297962 A1* | 10/2014 | Rozas | G06F 12/0808 711/135 |
| 2015/0089502 A1* | 3/2015 | Horovitz | G06F 9/45545 718/1 |
| 2015/0186678 A1* | 7/2015 | Leslie-Hurd | G06F 21/74 726/26 |
| 2015/0378941 A1* | 12/2015 | Rozas | G06F 13/24 710/267 |
| 2015/0379297 A1* | 12/2015 | Hunt | G06F 21/6218 726/26 |
| 2016/0188873 A1* | 6/2016 | Smith | G06F 21/53 726/22 |
| 2017/0068455 A1* | 3/2017 | Xing | G06F 3/0605 |
| 2017/0083724 A1* | 3/2017 | Chhabra | G06F 21/72 |
| 2017/0091445 A1* | 3/2017 | Xing | G06F 21/53 |

OTHER PUBLICATIONS

McKeen, et al., "Innovative Instructions and Software Model for Isolated Execution", INTEL® Corporation, Copyright 2013, pp. 1-8.

* cited by examiner

METHOD TO INCREASE CLOUD AVAILABILITY AND SILICON ISOLATION USING SECURE ENCLAVES

BACKGROUND INFORMATION

During the past decade, there has been tremendous growth in the usage of so-called "cloud-hosted" services. Examples of such services include e-mail services provided by Microsoft (Hotmail/Outlook online), Google (gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services are typically implemented using data centers that have a very large number of compute resources, implemented in racks of various types of servers, such as blade servers filled with server blades and/or modules and other types of server configurations (e.g., 1U, 2U, and 4U servers).

A key measure for both server OEMs (Original Equipment Manufacturers) and CSPs (Cloud Service Providers) is Reliability, Availability, and Serviceability (RAS). While RAS was first used by IBM to define specifications for its mainframes and originally applied to hardware, in today's data centers RAS also applies to software and networks.

Server OEMs and CSPs have continually indicated that hardware RAS handling needs to continue to improve on system resilience. In today's virtualized environments, multiple virtual machines (VMs) are run on host processors with multiple cores, with each VM hosting a set of one or more services (or applications/processes associated with such services). In the event of a processor fault requiring a reset, the resulting loss of host availability might apply to dozens of services, representing a significant cost. Specifically, when the silicon (i.e., processor hardware) sees an uncorrectable error, it will signal a machine check and typically log an error with PCC=1 (processor context corrupt). Such errors require that the silicon be reset in order to function properly. Under current approaches, this necessitates taking down any software running on the processor, including all VMs and thus all software-based services hosted by the VMs.

However, on the other hand, hardware advancements include support for various features relating to resiliency, such as enhanced Machine Check, firmware-first handling of errors, and memory poisoning and the like to ensure higher levels of availability (system uptime) and serviceability. While these advancements are noteworthy, OEMs and CSPs would like to be enabled to take advantage of these capabilities in a larger fashion than currently available today.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus to increase cloud availability and silicon isolation using secure enclaves are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation published documents describing the INTEL® Software Guard Extensions (INTEL® SGX), a set of instructions and mechanisms for memory accesses added to future INTEL® Architecture processors. INTEL® SGX can encompass two collections of instruction extensions, referred to as SGX1 and SGX2. The SGX1 extensions allow an application to instantiate a protected container, referred to as an enclave.

An enclave is a protected area in the application's address space (see FIG. 1), which provides confidentiality and integrity even in the presence of privileged malware. Accesses to the enclave memory area from any software not resident in the enclave are pre-vented. The SGX2 extensions allow additional flexibility in runtime management of enclave resources and thread execution within an enclave.

SGX when used in a server environment is a technology that is aimed at ensuring that users' applications hosted in the cloud are secure from inspection, corruption, etc. The issue is how servers are used with virtualization and sharing system resources coupled with OEM and CSP management of those system resources in RAS (e.g. error) events.

SGX and RAS requirements are at odds in that the SGX mission is to protect customer enclaves at all times by bringing down the system if necessary whereas the CSP/OEM mission is to maximize uptime. The embodiments described herein address both concerns, enabling failed/failing hardware to selectively reset without taking down the entire server. The Intel RAS theme to date has been to allow CSPs/OEMs who understand the hardware & silicon to attempt to correct the underlying problem to increase system uptime.

In accordance with a first approach, extensions are added to the SGX architecture to enable software running in or associated with secure enclaves to assist in the handling of RAS events, such as uncorrectable or fatal error events. As described in further detail below, a mechanism is provided for creating a new level of RAS that surfaces enclave level RAS features targeting the owner of the enclave. More particularly, the enclave will have the opportunity to handle the error event in a manner that the enclave owner deems appropriate. This could include WLOG (without loss of generality), shutting down the enclave, handing control to the OEM/CSP platform or OS code, cleaning up secure information prior to handoff, etc.

In order to have a better understanding of the implementation environments, a brief discussion of selected SGX features and architecture is now discussed.

SGX allows the protected portion of an application to be distributed in the clear. Before the enclave is built, the enclave code and data is free for inspection and analysis. The protected portion is loaded into an enclave where its code and data is measured. Once the application's code and data is loaded into an enclave, it is protected against all external software access. An application can prove its identity to a remote party and be securely provisioned with keys and credentials. The application can also request an enclave & platform specific key that it can use to protect keys and data that it wishes to store outside the enclave.

Figure 1:
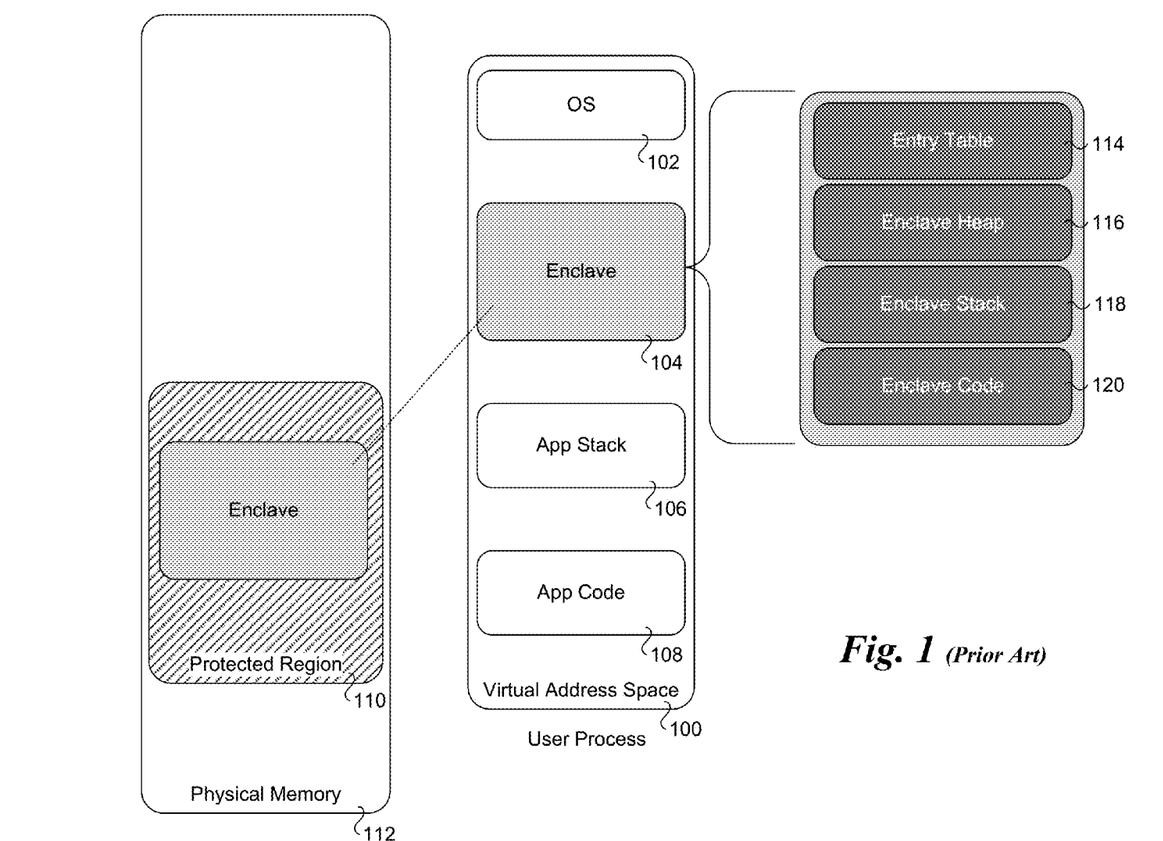
FIG. 1 is a schematic diagram illustrating the location of a secure enclave in physical and virtual memory, and an exemplary set of components for a secure enclave.

FIG. 1 shows a memory layout of a platform's virtual address space 100 including an operating system (OS) 102, an enclave 104, an application stack 106 and application code 108. The enclave 104 virtual memory is mapped to a protected area 110 of physical memory 112. Enclave 104 is further depicted as including an entry table 114, an enclave heap 116, an enclave stack 118, and enclave code 120.

Figure 2:
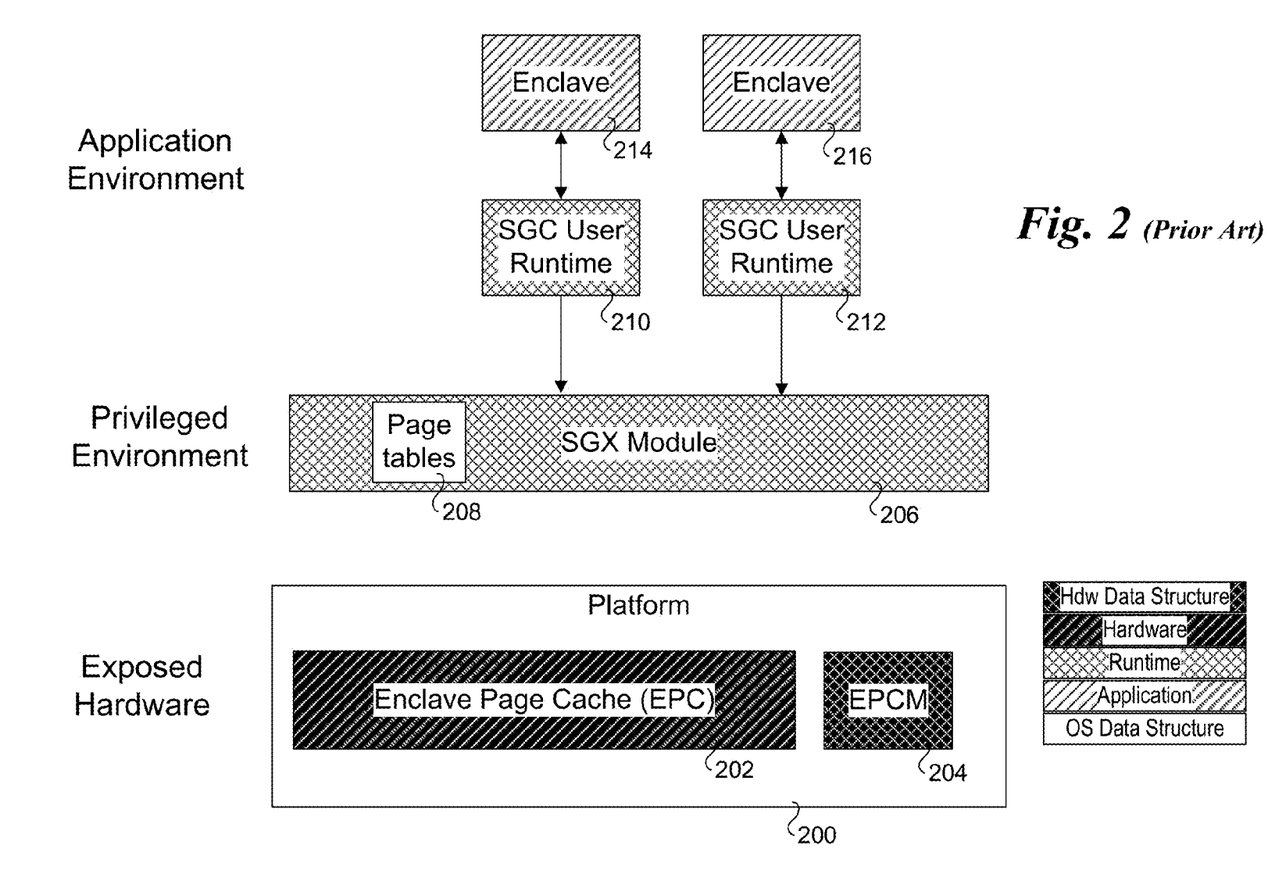
FIG. 2 is a schematic diagram illustrating a high-level SGX hardware and software architecture.

FIG. 2 shows a high-level SGX hardware and software architecture. The architecture includes an exposed hardware layer, a privileged environment layer, and an application environment layer. The exposed hardware on a platform 200 includes an Enclave Page Cache (EPC) 202, and an Enclave Page Cache Map (EPCM) 204. In one embodiment, EPC 202 contains protected code and data in 4K pages, while EPCM 204 contains meta-data for each enclave page. An SGX module 206 comprising a runtime component is depicted in the privileged environment layer, and includes page tables 208 that are implemented via corresponding page table data structures in the OS. The application environment layer includes SGC user runtime instances 210 and 212, and enclaves 214 and 216.

At a high level, a CPU that supports SGX and implements EPC in cryptographically protected platform DRAM supports the ability for the BIOS to reserve a range(s) of memory called Processor Reserved Memory (PRM). The BIOS allocates the PRM by configuring a set of range registers, collectively known as the PRMRR.

Use of main memory as storage for the EPC is very desirable for many implementations. The challenge is there are many known software and hardware attacks that can be waged on DRAM memory. Cryptographically protecting the EPC contents in DRAM is one way to defend against these attacks.

This is facilitated by a Memory Encryption Engine (MEE), which is a hardware unit that encrypts and integrity protects selected traffic between the processor package and the main memory (DRAM). The overall memory region that an MEE operates on is called an MEE Region. Depending on implementation, the PRM is covered by one or more MEE regions.

Memory Access Semantics

Figure 3:
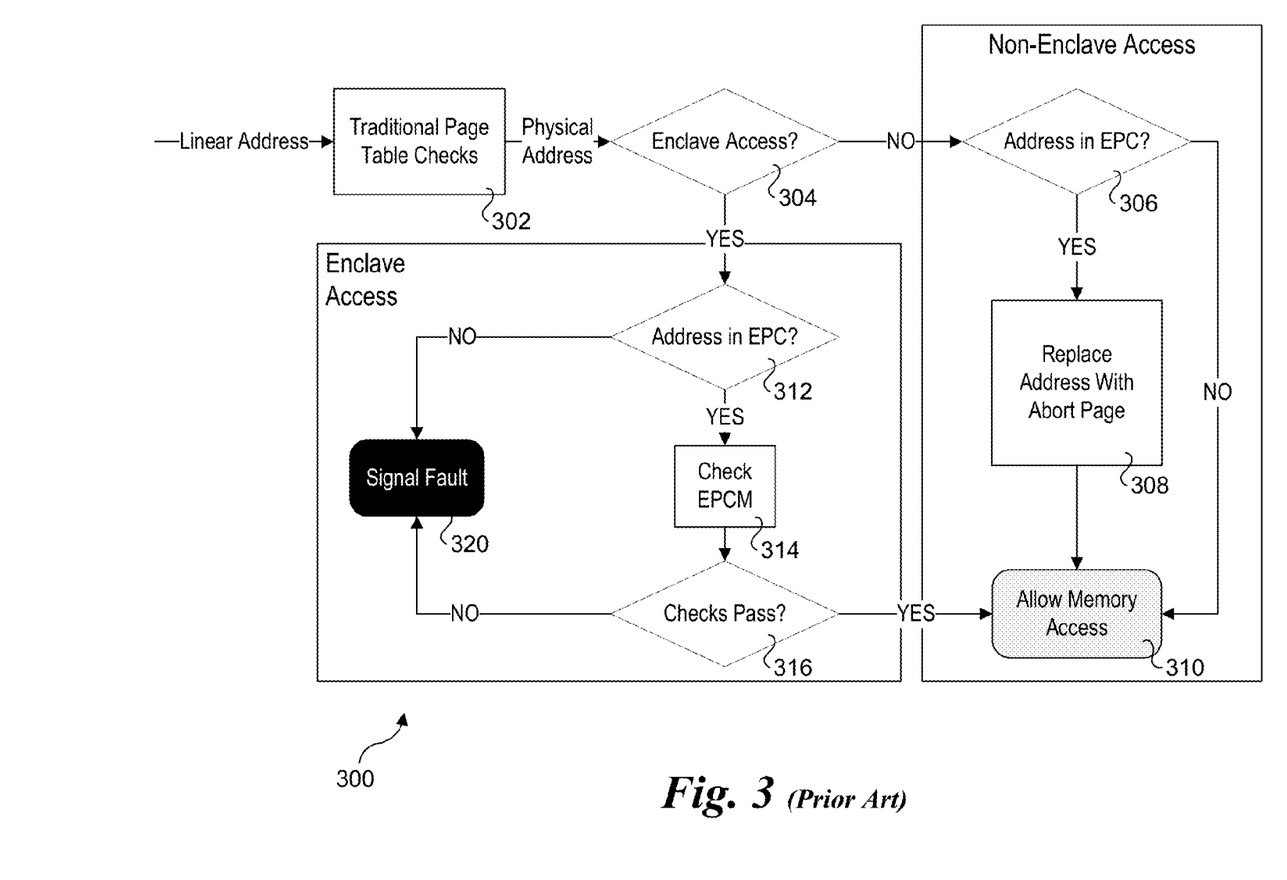
FIG. 3 is a flowchart illustrating operations and logic relating to enclave and non-enclave memory accesses.

CPU memory protection mechanisms physically block access to PRM from all external agents (DMA, graphic engine, etc.), by treating such accesses as references to nonexistent memory. To access a page inside an enclave using MOV and other memory related instructions, the hardware checks as described in FIG. 3, the following:

Logical processor is executing in "enclave mode"
Page belongs to enclave that the logical processor is executing
Page accessed using the correct virtual address If the accessed page is not part of the enclave's virtual address space but is part of the EPC then the access is treated as a reference to nonexistent memory. If the page is outside of the enclave virtual address space, then hardware allows the enclave code to access the memory outside of PRM. If the page is outside of the enclave's virtual address space and resolves into a PRM page, hardware prevents such access by signaling a fault. Accesses by a processor not in enclave mode to an enclave page are treated as a reference to nonexistent memory.

FIG. 3 shows a flowchart 300 illustrating operations and logic relating to enclave and non-enclave memory accesses. In a block 302 a linear memory address is received and traditional page table checks are performed, resulting in an output physical address. In a decision block 304 a determination is made to whether the physical address corresponds to an enclave access (e.g., the physical address corresponds to a region in physical memory allocated for an enclave). If the answer is NO, the access is a non-enclave access, and the logic proceeds to a decision block 306 in which a determination is made to whether the address is an Enclave Page Cache. Since it shouldn't be (for a non-enclave access), if the answer is YES that logic proceeds to a block 308 in which the address is replaced with an abort page. If the answer to decision block 306 is NO, this is a conventional memory access, which is allowed in a block 310.

Returning to decision block 304, if the memory access is an enclave access the answer is YES, and the logic proceeds to a decision block 312 in which a determination is made to whether the address is an Enclave Page Cache. If the answer is YES, an EPCM check is performed in a block 314, and if the checks pass, as depicted by a decision block 316, the logic proceeds to block 310, thus allowing the memory access. If the answer to either decision block 312 or 316 is NO, the logic proceeds to a signal fault block 320, which signals a memory access fault.

Figure 4A:
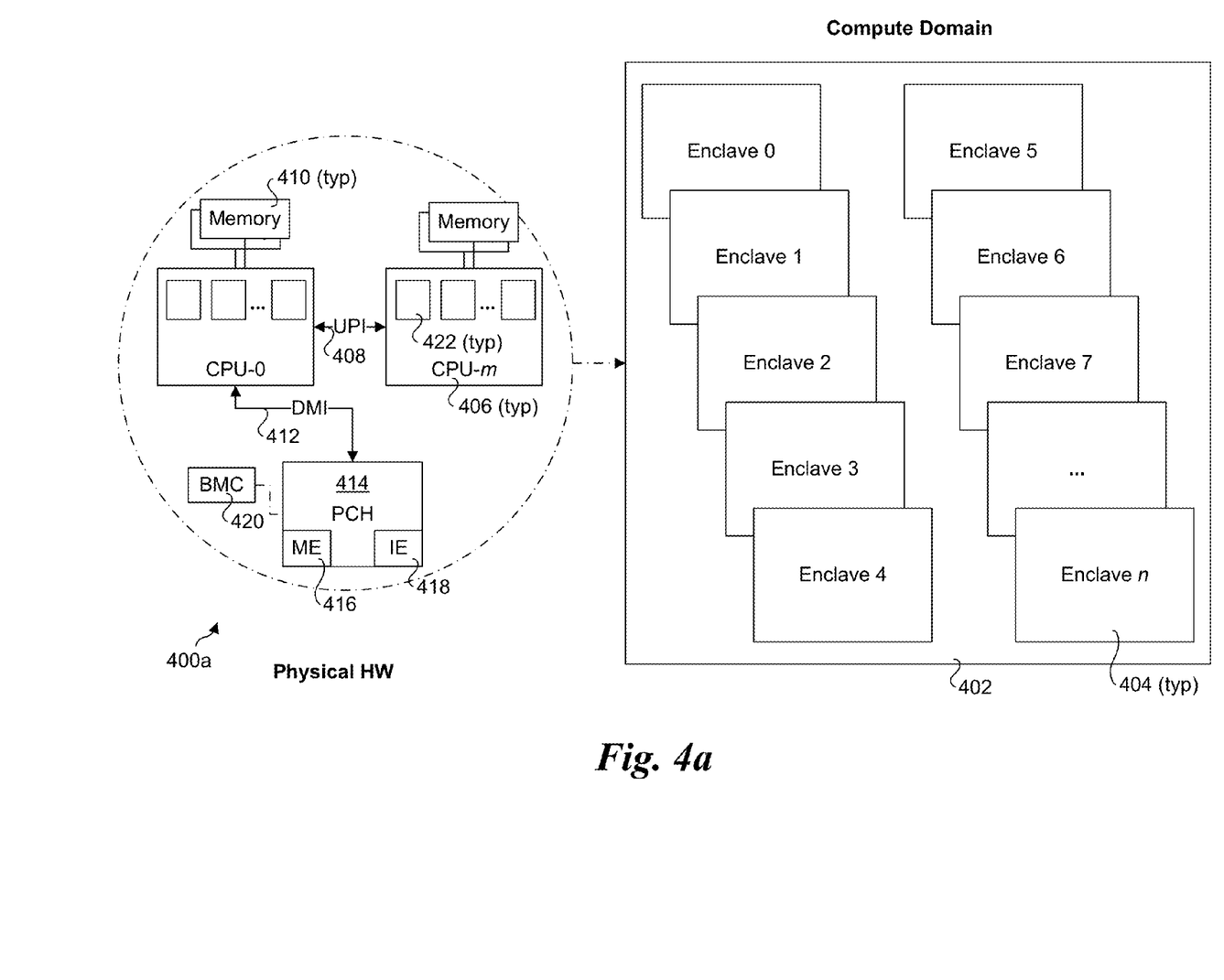
FIG. 4a is a schematic diagram illustrating an exemplary compute platform and a compute domain in which multiple secure enclaves are implemented.

FIG. 4a shows an exemplary compute platform 400a and a compute domain 402 in which n enclaves 404 are implemented. Computer platform 400 includes m processing units (CPUs) 406 coupled via a UPI (Universal Path Interconnect) interconnect 408. Each CPU 406 is coupled to a respective memory 410. CPU-0 is coupled via a direct media interface (DMI) 412 to a platform controller hub (PCH) 414 including a manageability engine (ME) 416 and an innovation engine (IE) 418. An optional baseboard management controller (BMC) 420 is also depicted as coupled to PCI 414.

In one embodiment, each of CPUs 406 include multiple cores 422. Also, a CPU 406 may have multiple memory channels, as configured to access separate portions of memory 410.

In one embodiment ME 416 is implemented as a converged security and manageability engine (CSME). In some embodiments, original equipment manufacturers (OEMs) may want to deploy customized functionality to augment the facilities provided by ME 416. These may be implemented by IE 418, which is also referred to as an OEM innovation engine. Generally, the use of IE 418 is optional. ME 416 and IE 418 (if used) are part of a manageability subsystem that is used to perform platform manageability operations.

Under one embodiment of a current SGX architecture, each SGX enclave 404 has dedicated hardware (e.g., a dedicated CPU, one or more dedicated processor cores and memory). In one embodiment, m=n, and there is a dedicated CPU 406 and its associated memory 410 for each enclave 404. Optionally, as will be illustrated below, each enclave will be associated with certain IP (Intellectual Property) blocks (also commonly referred to simply as "IP"), some of which may be dedicated and some of which may be shared across two or more enclaves.

Under the current approach, when a platform event occurs, like MCERR (machine check error), by design all the enclaves are wiped out and the system requires a reset to enable correct operation. If the hardware, OS, or platform software determines that a certain piece of hardware/software caused the error it does not matter, the enclave is protected and will be wiped out. This holds true even if the error encountered were of the "recoverable" variety. If SGX is not enabled, then traditional error handling occurs, but STILL if there is an error where PCC (Processor Context Corrupted) is set, then a reset is required, which is true for the vast majority of errors.

Under one embodiment of the novel approaches herein, the platform silicon is configured to enable a directed MCERR (machine check) to the enclave that was impacted (not to all) and put that information into a register (e.g., a configuration space register (CSR)). The reason for adding this information into a register is that when the silicon asserts the error, the manageability subcomponent will see the error asserted by a pin/interrupt. The manageability subcomponent will then get engaged and it will need to determine which enclave was impacted by the error.

In addition, the approach also includes:
1. Classifying the CPU error sources as enclave-specific or system-wide. For example, Memory subsystem errors can be enclave specific, but KTI interconnect subsystem errors will be system-wide.
2. Adding the capability for the IPs to be configured with what enclave(s) that they belong to and send MCERR to only the core(s) consuming the IP's resources.

When the enclave(s) receives the interrupt (synchronous error signaling), it/they will have a decision on handling the error. This could include allowing a trusted partner (CSP/OEM, alternate enclave, platform firmware (FW), OS, etc.) to handle the error, pass information or just stop the enclave all together. This will be more apparent in the firmware flows below.

Figure 4B:
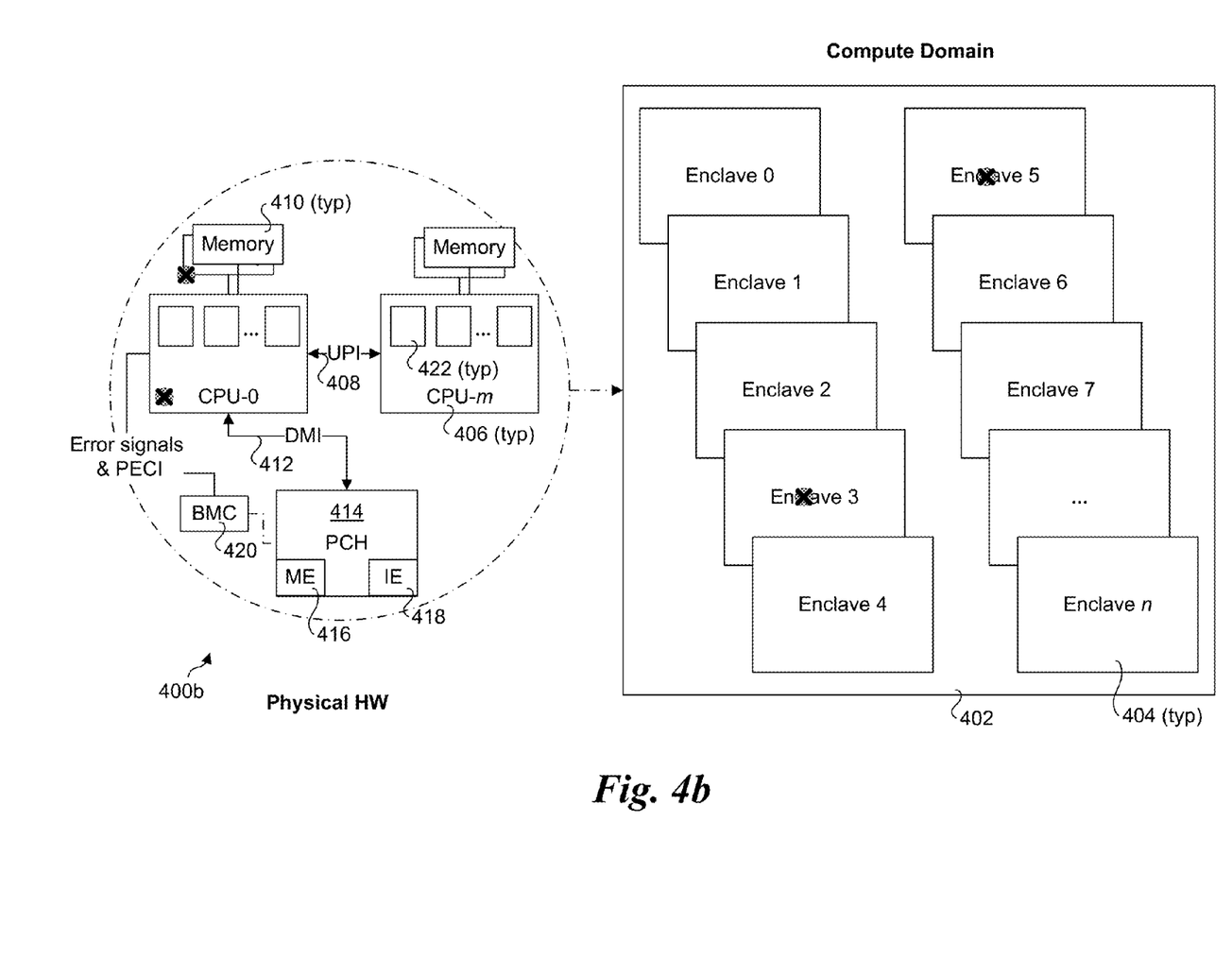
FIG. 4b is a schematic diagram illustrating an augmented version of the compute platform of FIG. 4a to support recovery from platform errors without having to reset the entire compute platform, according to one embodiment.

FIG. 4b shows one embodiment of the new architecture 400b at a high level. As illustrated, compute platform 400b further adds error signals and PECI (Platform Environment Control Interface) signals that are sent between BMC 420 to CPU-0. For example, CPU-0 might assert an error such as ERR[0], ERR[1], ERR[2], MSMI#, CATERR#, etc., which is detectable by BMC 420. In this example, an IP in CPU-0 has been detected to be errant, which led to a memory failure or corruption in a portion of memory 410 accessed via CPU-0. Part of the errant platform IP/memory resources were allocated to enclaves 3 and 5 when these enclaves were configured and instantiated. Accordingly, only enclaves 3 and 5 will be taken down in connection with resetting the errant IP, while operation of the remaining enclaves is unaffected.

In one embodiment, when an error occurs in the silicon the CPU will assert external pins, and the error will be detected by BMC 420, ME 416 or IE 418. The BMC 420, ME 416 or IE 418 will either store information that maps secure enclaves to their resources or has access to such information. Based on the particular error, the BMC/ME/IE will use the resource mapping information to identify the secure enclaves that are effected and send corresponding information back to the CPU identifying the affected secure enclaves. The CPU will then directed interrupt to the affected enclave(s). In one embodiment, during enclave setup, the enclave will be responsible for creating a critical enclave platform interrupt handler for servicing the interrupt.

Figure 5:
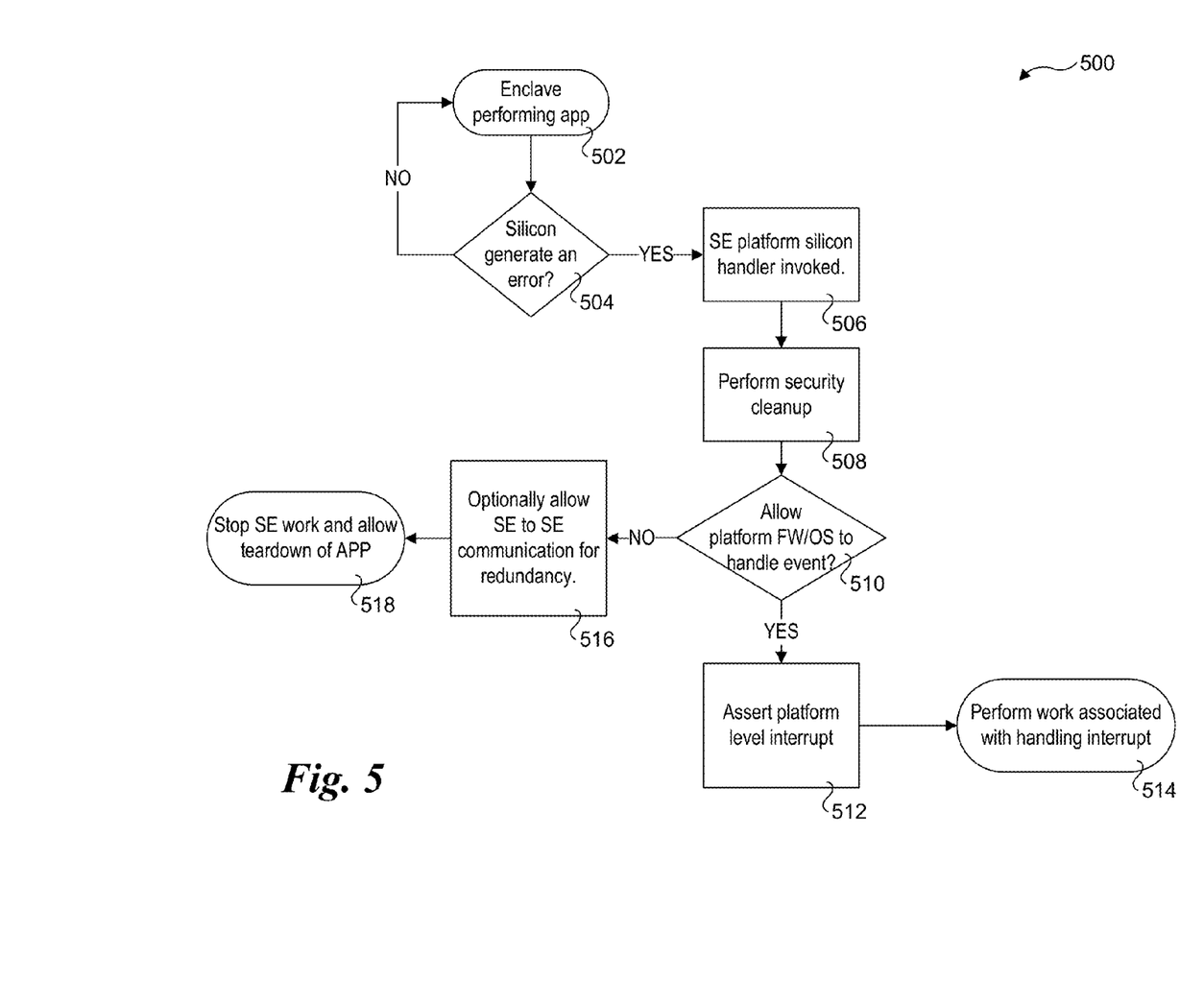
FIG. 5 is a flowchart illustrating operations and logic performed by a compute platform hosting one or more secure enclaves in response to a platform error event, according to one embodiment.

Flowchart 500 of FIG. 5 shows how an enclave responds to an error event, according to one embodiment. The flow begins in a start bock 502, with an enclave performing an application. Occurrences of silicon errors are depicted by a decision block 504, which is an asynchronous event but shown as a looped flow for simplicity and convenience. In response to a silicon generated error, the answer to decision block 504 is YES, and the logic flows to a block 506 in which the secure enclave (SE) platform silicon handler is invoked.

Next, in a block 508, security cleanup is performed. It is expected that the SE will have some amount of information that needs to be disposed of in an orderly manner. For example, in one embodiment an enclave would zero all keys, and securely erase memory associated with the enclave.

The logic next flows to a decision block 510, in which a determination is made to whether to allow firmware or the operating system to handle the event. If the answer is YES, a platform level interrupt is asserted in a block 512, and the associated interrupt handling work is performed in an end block 514. If the answer to decision block 510 is NO, the logic proceeds to a block 516 in which optional SE to SE communication is allowed for redundancy (e.g., data maintained by an SE that is to be torn down is communicated to another SE that will not be torn down). The SE work is then stopped, and teardown of the application is allowed, as depicted in an end block 518.

Figure 6:
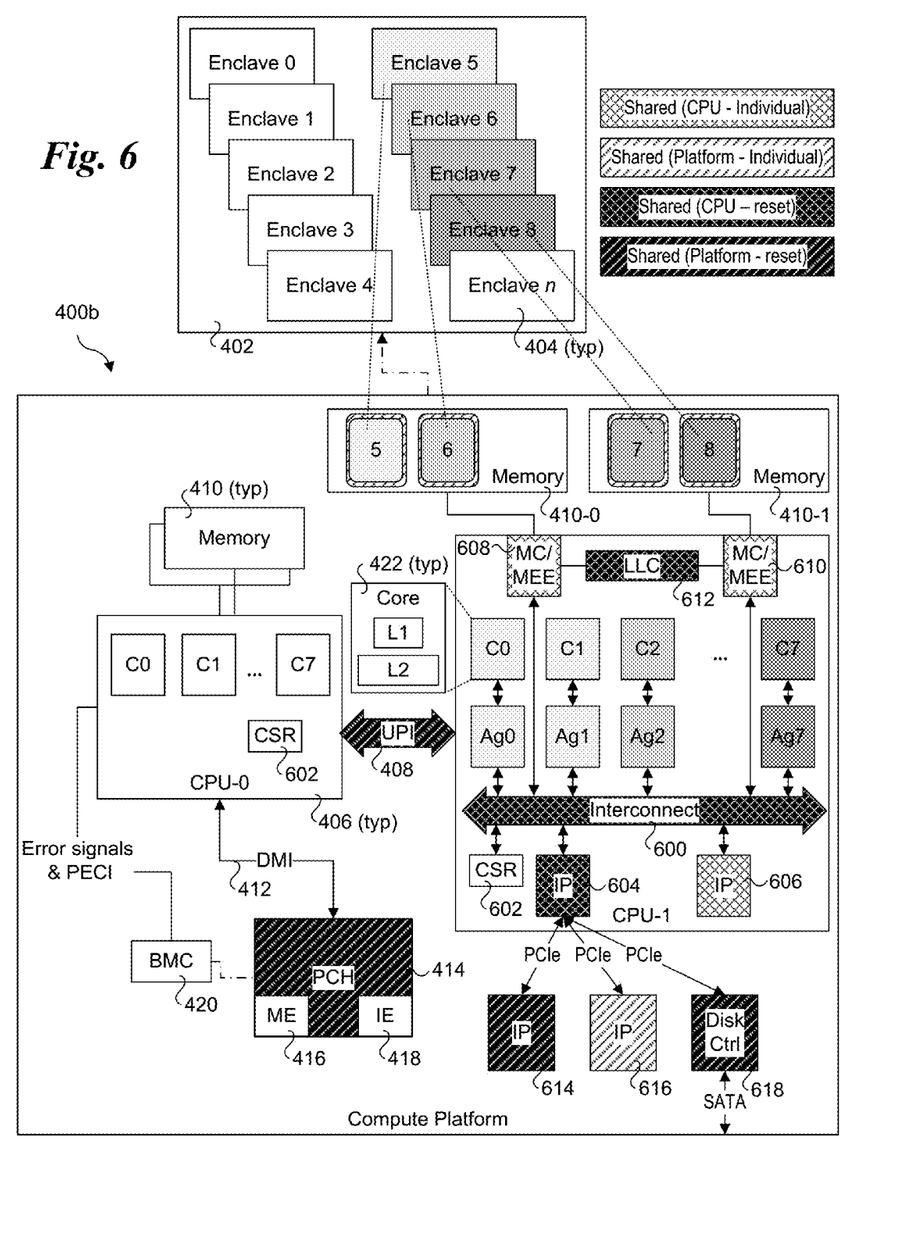
FIG. 6 is a schematic diagram illustrating a compute platform and compute domain in which multiple secure enclaves are implemented, further illustrating mappings between IP and components on the compute platform and secure enclaves to which the IP and components belong.

FIG. 6 shows further details of compute platform 400b, according to one embodiment. For simplicity and lack of drawing space, FIG. 6 only shows two CPUs 406, which will be referred to as CPU-0 and CPU-1. Generally, a compute platform may have 1-m CPUs, and depending on the architecture each CPU may be associated with a respective socket or be referred to as a socket. The compute platform illustrated in FIG. 6 may be referred to as a two-socket platform.

CPU-1 shows further details of a CPU 406, according to one embodiment. It will be understood that CPU-0 also has a similar configuration. Moreover, each of the m CPUs may have a similar configuration. CPU-1 includes 8 cores C0 . . . C7, each coupled to a respect agent A0 . . . A7. Agents A0 . . . A7 are coupled to an interconnect 600. Also shown coupled to interconnect 600 are a CSR 602, a pair of IPs 604 and 606, and a pair of memory controllers with memory encryption engines (MC/MEEs) 608 and 610 coupled to a last level cache (LLC) 612. As further shown in detail, each core 422 includes a Level 1 (L1) and Level 2 (L2) cache. Generally, agents A0 . . . A7 are representative of one or more agents that would typically be associated with a processor core, such as a caching agent.

In one embodiment, interconnect 600 corresponds to a coherent interconnect in a coherent memory domain that includes the L1/L2 caches of each core 422, LLC 612, and memory 410-0 and 410-1. In one embodiment, one or more of IP blocks 604 and 606 are connected to an input/output (I/O) interconnect (not shown for lack of space), which in turn is connected to interconnect 600 via a bridge or the like.

As depicted, various platform resources are allocated to corresponding enclaves. For example, for CPU-1:
Cores C0 and C1 and their agents are allocated to Enclave 5;
Cores C2 and C3 (not shown) and their agents are allocated to Enclave 6;
Cores C4 and C5 and their agents are allocated to Enclave 7 (not shown); and
Cores C6 (not shown) and C7 and their agents are allocated to Enclave 8

There are protected regions of memory 410-0 and 410-1 that are used for Enclaves 5-8, as illustrated. (It is noted that memory 410-0 and 410-0 represent physical memory rather than virtual memory, but that the memory subsystem would have paging tables and the like (not shown) for mapping between physical memory and virtual memory.)

In one embodiment, IP 604 is a PCIe root controller, and each of IP blocks 614, 616 and disk controller 618 are coupled to IP 604 via a PCIe interconnect. One or more of IP 614, and 616 may represent an I/O component that is either mounted on a main board of compute platform 400b or installed in a PCIe slot on compute platform 400b (not separately shown). For example, in one embodiment, IP 614 is a network interface controller, while IP 616 is a graphics chip or represents a graphics card or graphics module.

FIG. 6 includes the use of various cross-hatch patterns to depict different types of shared resources and whether or not they can be reset individually or require a CPU or platform reset. For example, an error detected for PCH 414, UPI 408, or IP 614 would require a platform reset, which would involve tearing down all of the enclaves 404 hosted by compute platform 400b. Conversely, an error of IP 616 may be handled as a localized IP reset, which may not require tearing down any of the enclaves (depending on what type of functions are provided by IP 616).

Similarly, at the CPU level an error event for a given component may require reset of the CPU, or may be involve reset of an individual component (or set of related components). For example, if interconnect 600 errors, a reset of CPU-1 may be required, since interconnect 600 is associated with all memory accesses by processor cores 422 and CPU-1's associated coherent memory domain. Similarly, an errant LLC 612 may likewise require a CPU reset, depending on its particular architecture. For instance, if LLC 612 is implemented as a shared cache, a CPU reset may be required. Conversely, if LLC 612 is implemented as a "sliced" LLC, there may be conditions under which error handling for only those portions of memory associated with an errant slice would need to be performed. In addition, depending on the particular cache architecture, the data in an LLC may always reside elsewhere in either an L1 cache or L2 cache, such that an error in an LLC may not require tearing down any enclave.

Errors caused by some individual components on a CPU may also be handled by resetting that individual component or set of related components. Under such circumstances, only the enclave(s) associated with the errant component would need to be torn down. In some cases, the failed component may not produce data that is used by an enclave, and thus no enclaves would need to be torn down. For example, such a component is depicted by IP 606.

In the case of a core or agent error, the errant component (depending on the type of error) may be reset without having to reset other cores and/or agents. Under this scenario, on the enclaves associated with the errant core or agent would need to be torn down. For example, suppose there is an error in core C0. Since Core C0 is only associated with enclave 5, this is the only enclave that would need to be torn down in connection with resetting core C0.

In another instance, errors in some components in a CPU may result in tearing down only a portion of the enclaves associated with that CPU. For example, if an unrecoverable error for memory controller 608 is detected, enclaves 5 and 6 would be torn down, while enclaves 7 and 8 would not be affected.

Under another approach under which SGX is not enabled, virtual enclaves or vSEs are configured to effect appropriate error handling in a manner that enables reset of selected components (under applicable types of errors) without having to reset a CPU or take down an entire platform. The silicon micro-architecture is enhanced for a new level of RAS error isolation domain. In further detail, the silicon changes outlined below will provide additional RAS such that an error in a component of silicon will enable the enhanced micro-architecture to only reset the impacted areas of the silicon without impacting the rest of the compute platform and associated applications running on it.

[We could either leave the following material out, or keep it]

The following contains excerpts from Frank McKeen et al, *Innovative Instructions and Software Model for Isolated Execution*, INTEL® Corporation, 2013, which is incorporated herein by reference.

Enclave Creation and Setup

The enclave creation process loads enclave binary into the EPC and establishes the enclave identity. The enclave creation process is divided into multiple stages, including initialization of enclave control structure, allocation of EPC pages and loading of enclave content into the pages, measurement of the enclave contents and finally establishing the enclave identity.

These operations are supported by the following instructions: ECREATE EADD, EEXTEND, and EINIT. ECREATE starts the enclave creation process and initializes the SGX Enclave Control Structure (SECS) which contains global information about the enclave. EADD commits EPC pages to an enclave and records the commitment but not the contents in the SECS. The memory contents of an enclave are explicitly measured by EEXTEND. EINIT completes the creation process, which finalizes the enclave measurement and establishes the enclave identity. Until an EINIT is executed, enclave entry is not permitted.

The enclave creation process begins with ECREATE, which converts a free EPC page into an SECS page and initializes the structure. As part of ECREATE, system software selects which EPC page to be made an SECS and specifies several attributes of the enclave including the range of protected addresses the enclave can access, the mode of operation (32 bit vs 64 bit), processor features supported by the enclave, and whether debug access is allowed.

Enclave Entry and Exiting

Critical to preserving the integrity of an enclave is to control transfer of execution into and out of an enclave. The entry process needs to clear any cached translations that overlap with the enclave's protected address region. This ensures that all protected enclave memory accesses are properly checked. The entry process must identify where inside the enclave the processor should transfer control and enable enclave mode of execution. Exiting an enclave must again clear any cached translations referring to the enclave's protected address region so that no other software can use the cached translations to access the enclave's protected memory.

While operating in enclave mode, an interrupt, fault or exception may occur. Traditionally, the processor would vector to a fault handler specified by system software. The fault handler saves the register state and services the event. Once the event has been serviced, system software restores the register state and returns control to where software was interrupted. Allowing system software to read and/or modify the register state of an enclave places system software within the trust boundary of the enclave. Consequently, SGX introduces a new routine to protect the integrity and confidentiality of the enclave.

SGX offers the EENTER and EEXIT instructions to enter and exit an enclave programmatically (e.g. as part of call/return sequence). When enclave exit occurs due to an event, the processor invokes a special internal routine called Asynchronous Exit (AEX) which saves the enclave register state, clears the registers, sets the faulting instruction address to a value specified by EENTER. The ERESUME instruction restores the state back to allow the enclave to resume execution.

The EENTER instruction is the method to enter the enclave under program control. To execute EENTER, software must supply an address of a thread control structure (TCS) that is part of the enclave to be entered. The TCS indicates the location inside the enclave to transfer control and where inside the enclave AEX should store the register state. When a logical processor enters an enclave, the TCS is considered busy until the logical processors exits the enclave. SGX allows an enclave builder to define multiple TCS structures, thereby providing support for multithreaded enclaves EENTER also defines the Asynchronous Exit Pointer (AEP) parameter. AEP is an address external to the enclave which is used to transition back into the enclave after an AEX. The AEP is the address an exception handler will return to using IRET. Typically the location would contain the ERESUME instruction. ERESUME transfers control to the enclave address retrieved from the enclave saved state.

Asynchronous events, such as exceptions and interrupts may occur during execution inside an enclave. These events are referred to as Enclave Exiting Events (EEE). Upon an EEE, the processor state is securely saved inside the enclave and then replaced by a synthetic state to prevent leakage of secrets. The process of securely saving state and establishing the synthetic state is called an Asynchronous Enclave Exit (AEX).

As part of the EEE the AEP is pushed onto the stack as the location of the faulting address. This is the location where control will return after executing the IRET (Interrupt Return instruction). The ERESUME can be executed from that point to reenter the enclave.

After AEX has completed, the logical processor is no longer in enclave mode and the exiting event is processed normally. Any new events that occur after the AEX has completed are treated as having occurred outside the enclave.

After system software has serviced the event that caused the logical process to exit an enclave, the logical processor can re-start execution using ERESUME. Unlike EENTER, ERESUME restores registers and returns control to where execution was interrupted. If the cause of the exit was an exception or a fault and was not resolved, then the event will be triggered again. For example, if an enclave performs a divide by 0 operation, executing ERESUME will cause the enclave to attempt to re-execute the faulting instruction. In order to handle an exception that occurred inside the enclave, software should enter the enclave at a different location and invoke an exception handler, the EENTER instruction should be used. The exception handler can attempt to resolve the faulting condition or simply return and indicate to software that the enclave should be terminated.

Further aspects of the subject matter described herein are set out in the following numbered clauses:

1. A method for handling hardware errors in a compute platform hosting a compute domain in which a plurality of secure enclaves are implemented, the method comprising:
    detecting a platform error event corresponding to errant hardware in the compute platform;
    identifying one or more of the plurality of secure enclaves that are effected by the errant hardware; and
    directing an interrupt to each of the one or more of the plurality of secure enclaves that are identified.

2. The method of clause 1, wherein the errant hardware corresponds to an errant intellectual property block (IP) on a processor in the compute platform, the method further comprising:
    for at least one secure enclave that is associated with the errant IP,
    executing, in response to receipt of an interrupt directed to the secure enclave, one of an error handling routine or an initial portion of an error handling routine that causes the errant IP to be reset while not resetting the processor.

3. The method of clause 2, further comprising, for each of the at least one secure enclave that is associated with the errant IP:
    tearing down the secure enclave; and
    creating a new secure enclave after the errant IP has been reset.

4. The method of clause 2 or 3, wherein in response a first secure enclave receiving a directed interrupt, an interrupt service routine is executed by software running in the first secure enclave that copies at least a portion of data in the first secure enclave to a second secure enclave.

5. The method of any of the preceding clauses, wherein identifying the one or more of the plurality of secure enclaves that are effected by the errant hardware comprises:
    classifying platform error sources as enclave-specific or system-wide;
    configuring mapping data that identifies the secure enclaves belonging to each of a plurality of intellectual property blocks (IPs) on the compute platform;
    determining one of the IPs is the error source for the platform error event; and using the mapping data to identify the secure enclaves belonging to the IP that is determined to be the error source.

6. The method of any of the preceding clauses, further comprising:

during setup of a secure enclave, creating an enclave platform interrupt handler, wherein the enclave platform interrupt handler is configured to one of handle an interrupt directed to the secure enclave in response to the platform error event or initiate handling of the interrupt directed to the secure enclave.

7. The method of clause 6, wherein execution of the enclave platform interrupt handler by a first secure enclave copies at least a portion of data in the first secure enclave to a second secure enclave.

8. The method of any of the preceding clauses, wherein the plurality of secure enclaves are virtual secure enclaves.

9. The method of any of the preceding clauses, wherein the directed interrupt comprises a directed machine check.

10. The method of any of the preceding clauses, wherein the compute platform includes one or more processor, each having a plurality of intellectual property blocks (IPs), and one or more manageability components coupled in communication with at least one of the one or more processors, and wherein the errant hardware corresponds to an errant IP on a processor, the method further comprising:

storing mapping data that identifies the secure enclaves belonging to each of a plurality of intellectual property blocks (IPs) on the compute platform;

asserting an error via a processor pin or interrupt detected by a manageability component; and employing the manageability component to access the mapping data to determine which secure enclaves are affected by the errant IP.

11. The method of clause 10, wherein the manageability component comprises one of a manageability engine, an innovation engine, and a baseboard management controller.

12. The method of clause 10, further comprising:

sending information from the manageability component to the processor containing the errant IP identifying one or more secure enclaves affected by the errant IP; and in response to receiving the information at the processor, directing an interrupt to each of the one or more secure enclaves affected by the errant IP.

13. A processor, comprising:

a plurality of intellectual property blocks (IPs), interconnected via a plurality of interconnects, the plurality of IPs including a plurality of cores, a plurality of caches, a plurality of agents, one or more memory controllers, each having one or more memory channels, and one or more input/output (I/O) components, wherein the processor further includes microcode for a plurality of instructions used to implement a plurality of secure enclaves when the processor is installed and operating in a compute platform including one or more memory devices operatively coupled to the one or more memory controllers via the one or more memory channels, each secure enclave operating in a protected portion of memory in the one or more memory devices and having a portion of the plurality IPs belonging to it, and wherein the processor includes embedded logic configured to perform error recovery operations when installed and operating in the compute platform, the error recovery operations including, detecting an errant IP; and directing an interrupt to one or more of the plurality of secure enclaves to which the errant IP belongs.

16. The processor of clause 13, wherein the processor further comprises a register, and further includes embedded logic to enable the processor to:

store data in the register containing mappings between IPs and secure enclaves to which the IPs below; and determine, based on an identity of an IP that is detected to be errant, which of the plurality of secure enclaves to send directed interrupts to.

15. The processor of clause 13 or 14, wherein the processor includes microcode instructions that enable the processor to reset individual IPs or selected sets of related IPs without resetting the entire processor.

14. The processor of any of clauses 13-15, wherein the embedded logic is further configured to receive identification of the one or more of the plurality of secure enclaves to which the errant IP belongs from a manageability component in the compute platform.

17. The processor of any of clauses 13-16, wherein the plurality of secure enclaves are virtual secure enclaves.

18. The processor of any of clauses 13-17, wherein the compute platform includes a manageability component to which the processor is communicatively coupled via at least one communication interface when installed in the compute platform, and wherein in response to detecting an errant IP the processor is configured to:

assert an error signal on a pin or assert an interrupt via a communication interface to inform the manageability component of an error; and receive information returned by the manageability component via a communication interface that identifies one or more secure enclaves to which to direct an interrupt.

19. A compute platform, comprising:

a first processor including, a plurality of intellectual property blocks (IPs), interconnected via a plurality of interconnects, the plurality of IPs including a plurality of cores, a plurality of caches, a plurality of agents, one or more memory controllers, each having one or more memory channels, and one or more input/output (I/O) components; and one or more first memory devices operatively coupled to the one or more memory controllers of the first processor via the one or more memory channels, wherein the first processor further includes microcode for a plurality of instructions used to implement a plurality of secure enclaves when the compute platform is operating, each secure enclave operating in a protected portion of memory in the one or more memory devices and having a portion of the plurality IPs belonging to it, and wherein the first processor includes embedded logic configured to perform error recovery operations comprising, detecting an errant IP; and directing an interrupt to one or more of the plurality of secure enclaves to which the errant IP belongs.

20. The compute platform of clause 19, further comprising:

a register; and a manageability component, operatively coupled to the first processor;

wherein during operation of the compute platform mapping information is stored in the register that maps each secure enclave to the IPs belonging to that secure enclave, and wherein in response to detecting an errant IP, the first processor is configured assert an error via a processor pin or interrupt directed to the manageability component, the asserted error identifying the errant IP; and the manageability component is configured to retrieve data from the register to identify which secure enclaves the IP belongs to.

21. The compute platform of clause 20, wherein the first processor is further configured to:

receive identification of the one or more of the plurality of secure enclaves to which the errant IP belongs from the manageability component in the compute platform; and direct an interrupt to each of the secure enclaves that are identified.

22. The compute platform of any of clauses 19-21, wherein the first processor includes microcode instructions that enable the processor to reset individual IPs or selected sets of related IPs without resetting the entire processor.

23. The compute platform of clause 22, wherein in response to receiving a directed interrupt, a secure enclave executes an interrupt handler that causes the errant IP to be reset without resetting the first processor.

24. The compute platform of any of clauses 19-23, further comprising:

a second processor including, a plurality of intellectual property blocks (IPs), interconnected via a plurality of interconnects, the plurality of IPs including a plurality of cores, a plurality of caches, a plurality of agents, one or more memory controllers, each having one or more memory channels, and one or more input/output (I/O) components;

one or more second memory devices operatively coupled to the one or more memory controllers of the second processor via the one or more memory channels; and a processor to processor interconnect coupling the first processor and second processor in communication;

wherein the second processor further includes microcode for a plurality of instructions used to implement a plurality of secure enclaves when the compute platform is operating, each secure enclave operating in a protected portion of memory in the one or more memory devices and having a portion of the plurality IPs belonging to it, and wherein the compute platform is further configured to, store data classifying platform error sources as enclave-specific or system-wide;

detect a system-wide platform error; and direct an interrupt to each secure enclave to cause each enclave to execute an interrupt handler; and subsequent to each secure enclave completing execution of its interrupt handler, reset the compute platform.

25. The compute platform of any of clauses 19-24, wherein the plurality of secure enclaves are virtual secure enclaves.

26. A tangible, non-transitory machine-readable medium having instructions stored thereon configured to be executed by a processor in a compute platform, wherein the processor includes a plurality of intellectual property blocks (IPs), interconnected via a plurality of interconnects, the plurality of IPs including a plurality of cores, a plurality of caches, a plurality of agents, one or more memory controllers, each having one or more memory channels, and one or more input/output (I/O) components, the compute platform further including one or more memory devices coupled to the one or more memory controllers via the one or more memory channels, wherein execution of the instructions cause the compute platform to:

create a plurality of secure enclaves, each secure enclave deployed in a protected region of a memory address space and configured to prevent access by user-level software that is not in the secure enclave; and implement an interrupt service routine (ISR) in response to a directed interrupt resulting from an errant IP, the ISR causing a portion of the processor including the errant IP to be reset without resetting the processor.

27. The tangible, non-transitory machine-readable medium of clause 26, wherein execution of the instructions further causes the compute platform to send a directed interrupt to each or one or more secure enclaves using the errant IP has a resource.

28. The tangible, non-transitory machine-readable medium of clause 27, wherein in response to receiving a directed interrupt, the secure enclave performs one or more security cleanup operations.

29. The tangible, non-transitory machine-readable medium of clause 28, wherein the one or more security cleanup operations include securely erase memory associated with the secure enclave.

30. The tangible, non-transitory machine-readable medium of any of clauses 26-29, wherein execution of the instructions further causes the compute platform to:

tear down a secure enclave; and create a new secure enclave after the errant IP has been reset.

31. The tangible, non-transitory machine-readable medium of clause 30, wherein execution of the instructions further causes the compute platform to perform a security cleanup operation on the secure enclave prior to tearing it down.

32. The tangible, non-transitory machine-readable medium of clause 30, wherein the instructions include an interrupt service routine that is executed by software running in the first secure enclave in response to receiving a directed interrupt that copies at least a portion of data in the first secure enclave to a second secure enclave.

33. The tangible, non-transitory machine-readable medium of any of clauses 26-32, wherein execution of the instructions further causes the compute platform to create an enclave platform interrupt handler during setup of a secure enclave, wherein the enclave platform interrupt handler is configured to one of handle an interrupt directed to the secure enclave in response to the platform error event or initiate handling of the interrupt directed to the secure enclave.

34. The tangible, non-transitory machine-readable medium of clause 33, wherein execution of the enclave platform interrupt handler by a first secure enclave copies at least a portion of data in the first secure enclave to a second secure enclave.

35. The tangible, non-transitory machine-readable medium of any of clauses 26-32, wherein the plurality of secure enclaves are virtual secure enclaves.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for handling hardware errors in a compute platform hosting a compute domain in which a plurality of secure enclaves are implemented, the method comprising:
    detecting a platform error event corresponding to errant hardware in the compute platform;
    identifying one or more of the plurality of secure enclaves that are effected by the errant hardware; and
    directing an interrupt to each of the one or more of the plurality of secure enclaves that are identified.

2. The method of claim 1, wherein the errant hardware corresponds to an errant intellectual property block (IP) on a processor in the compute platform, the method further comprising:

for at least one secure enclave that is associated with the errant IP,
executing, in response to receipt of an interrupt directed to the secure enclave, one of an error handling routine or an initial portion of an error handling routine that causes the errant IP to be reset while not resetting the processor.

3. The method of claim 2, further comprising, for each of the at least one secure enclave that is associated with the errant IP:
tearing down the secure enclave; and
creating a new secure enclave after the errant IP has been reset.

4. The method of claim 2, wherein in response a first secure enclave receiving a directed interrupt, an interrupt service routine is executed by software running in the first secure enclave that copies at least a portion of data in the first secure enclave to a second secure enclave.

5. The method of claim 1, wherein identifying the one or more of the plurality of secure enclaves that are effected by the errant hardware comprises:
classifying platform error sources as enclave-specific or system-wide;
configuring mapping data that identifies the secure enclaves belonging to each of a plurality of intellectual property blocks (IPs) on the compute platform;
determining one of the IPs is the error source for the platform error event; and
using the mapping data to identify the secure enclaves belonging to the IP that is determined to be the error source.

6. The method of claim 1, further comprising:
during setup of a secure enclave, creating an enclave platform interrupt handler, wherein the enclave platform interrupt handler is configured to one of handle an interrupt directed to the secure enclave in response to the platform error event or initiate handling of the interrupt directed to the secure enclave.

7. The method of claim 6, wherein execution of the enclave platform interrupt handler by a first secure enclave copies at least a portion of data in the first secure enclave to a second secure enclave.

8. The method of claim 1, wherein the plurality of secure enclaves are virtual secure enclaves.

9. The method of claim 1, wherein the directed interrupt comprises a directed machine check.

10. The method of claim 1, wherein the compute platform includes one or more processor, each having a plurality of intellectual property blocks (IPs), and one or more manageability components coupled in communication with at least one of the one or more processors, and wherein the errant hardware corresponds to an errant IP on a processor, the method further comprising:
storing mapping data that identifies the secure enclaves belonging to each of a plurality of intellectual property blocks (IPs) on the compute platform;
asserting an error via a processor pin or interrupt detected by a manageability component; and
employing the manageability component to access the mapping data to determine which secure enclaves are affected by the errant IP.

11. The method of claim 10, wherein the manageability component comprises one of a manageability engine, an innovation engine, and a baseboard management controller.

12. The method of claim 10, further comprising:
sending information from the manageability component to the processor containing the errant IP identifying one or more secure enclaves affected by the errant IP; and
in response to receiving the information at the processor, directing an interrupt to each of the one or more secure enclaves affected by the errant IP.

13. A processor, comprising:
a plurality of intellectual property blocks (IPs), interconnected via a plurality of interconnects, the plurality of IPs including a plurality of cores, a plurality of caches, a plurality of agents, one or more memory controllers, each having one or more memory channels, and one or more input/output (I/O) components,
wherein the processor further includes microcode for a plurality of instructions used to implement a plurality of secure enclaves when the processor is installed and operating in a compute platform including one or more memory devices operatively coupled to the one or more memory controllers via the one or more memory channels, each secure enclave operating in a protected portion of memory in the one or more memory devices and having a portion of the plurality IPs belonging to it, and wherein the processor includes embedded logic configured to perform error recovery operations when installed and operating in the compute platform, the error recovery operations including,
detecting an errant IP; and
directing an interrupt to one or more of the plurality of secure enclaves to which the errant IP belongs.

14. The processor of claim 13, wherein the processor further comprises a register, and further includes embedded logic to enable the processor to:
store data in the register containing mappings between IPs and secure enclaves to which the IPs below; and
determine, based on an identity of an IP that is detected to be errant, which of the plurality of secure enclaves to send directed interrupts to.

15. The processor of claim 13, wherein the processor includes microcode instructions that enable the processor to reset individual IPs or selected sets of related IPs without resetting the entire processor.

16. The processor of claim 13, wherein the embedded logic is further configured to receive identification of the one or more of the plurality of secure enclaves to which the errant IP belongs from a manageability component in the compute platform.

17. The processor of claim 13, wherein the plurality of secure enclaves are virtual secure enclaves.

18. The processor of claim 13, wherein the compute platform includes a manageability component to which the processor is communicatively coupled via at least one communication interface when installed in the compute platform, and wherein in response to detecting an errant IP the processor is configured to:
assert an error signal on a pin or assert an interrupt via a communication interface to inform the manageability component of an error; and
receive information returned by the manageability component via a communication interface that identifies one or more secure enclaves to which to direct an interrupt.

19. A compute platform, comprising:
a first processor including,
a plurality of intellectual property blocks (IPs), interconnected via a plurality of interconnects, the plurality of IPs including a plurality of cores, a plurality of caches, a plurality of agents, one or more memory controllers, each having one or more memory channels, and one or more input/output (I/O) components; and one or more first memory devices operatively coupled to the one or more memory controllers of the first processor via the one or more memory channels, wherein the first processor further includes microcode for a plurality of instructions used to implement a plurality of secure enclaves when the compute platform is operating, each secure enclave operating in a protected portion of memory in the one or more memory devices and having a portion of the plurality IPs belonging to it, and wherein the first processor includes embedded logic configured to perform error recovery operations comprising, detecting an errant IP; and directing an interrupt to one or more of the plurality of secure enclaves to which the errant IP belongs.

20. The compute platform of claim 19, further comprising:

a register; and a manageability component, operatively coupled to the first processor;

wherein during operation of the compute platform mapping information is stored in the register that maps each secure enclave to the IPs belonging to that secure enclave, and wherein in response to detecting an errant IP, the first processor is configured assert an error via a processor pin or interrupt directed to the manageability component, the asserted error identifying the errant IP; and the manageability component is configured to retrieve data from the register to identify which secure enclaves the IP belongs to.

21. The compute platform of claim 20, wherein the first processor is further configured to:

receive identification of the one or more of the plurality of secure enclaves to which the errant IP belongs from the manageability component in the compute platform; and direct an interrupt to each of the secure enclaves that are identified.

22. The compute platform of claim 19, wherein the first processor includes microcode instructions that enable the processor to reset individual IPs or selected sets of related IPs without resetting the entire processor.

23. The compute platform of claim 22, wherein in response to receiving a directed interrupt, a secure enclave executes an interrupt handler that causes the errant IP to be reset without resetting the first processor.

24. The compute platform of claim 19, further comprising:

a second processor including, a plurality of intellectual property blocks (IPs), interconnected via a plurality of interconnects, the plurality of IPs including a plurality of cores, a plurality of caches, a plurality of agents, one or more memory controllers, each having one or more memory channels, and one or more input/output (I/O) components;

one or more second memory devices operatively coupled to the one or more memory controllers of the second processor via the one or more memory channels; and a processor to processor interconnect coupling the first processor and second processor in communication;

wherein the second processor further includes microcode for a plurality of instructions used to implement a plurality of secure enclaves when the compute platform is operating, each secure enclave operating in a protected portion of memory in the one or more memory devices and having a portion of the plurality IPs belonging to it, and wherein the compute platform is further configured to, store data classifying platform error sources as enclave-specific or system-wide;

detect a system-wide platform error; and direct an interrupt to each secure enclave to cause each enclave to execute an interrupt handler; and subsequent to each secure enclave completing execution of its interrupt handler, reset the compute platform.

25. The compute platform of claim 19, wherein the plurality of secure enclaves are virtual secure enclaves.

* * * * *